(12) United States Patent
Imanari et al.

(10) Patent No.: US 10,996,662 B2
(45) Date of Patent: May 4, 2021

(54) MANUFACTURING EQUIPMENT DIAGNOSIS SUPPORT SYSTEM

(71) Applicant: TOSHIBA MITSUBISHI-ELECTRIC INDUSTRIAL SYSTEMS CORPORATION, Chuo-ku (JP)

(72) Inventors: Hiroyuki Imanari, Tokyo (JP); Kazuhiro Ohara, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 259 days.

(21) Appl. No.: 15/308,011

(22) PCT Filed: May 20, 2014

(86) PCT No.: PCT/JP2014/063359
§ 371 (c)(1),
(2) Date: Oct. 31, 2016

(87) PCT Pub. No.: WO2015/177870
PCT Pub. Date: Nov. 26, 2015

(65) Prior Publication Data
US 2017/0083016 A1  Mar. 23, 2017

(51) Int. Cl.
*G05B 23/02* (2006.01)
(52) U.S. Cl.
CPC ..... *G05B 23/0218* (2013.01); *G05B 23/0235* (2013.01); *G05B 2219/24053* (2013.01)
(58) Field of Classification Search
None
See application file for complete search history.

(56) References Cited

U.S. PATENT DOCUMENTS

| 8,786,425 B1* | 7/2014 | Hutz | H04M 11/04 340/526 |
| 2006/0195201 A1* | 8/2006 | Nauck | G05B 17/02 700/30 |

(Continued)

FOREIGN PATENT DOCUMENTS

| JP | 11-344589 A | 12/1999 |
| JP | 2006-106870 A | 4/2006 |

(Continued)

OTHER PUBLICATIONS

International Search Report dated Jun. 24, 2014 in PCT/JP2014/063359 filed May 20, 2014.

*Primary Examiner* — Isaac T Tecklu
(74) *Attorney, Agent, or Firm* — Xsensus LLP (57) ABSTRACT

A manufacturing equipment diagnosis support system includes: a data collector which collects and records respective data in plural apparatuses to be monitored provided in manufacturing equipment; a data analysis device; and a display. The data analysis device includes: a data analysis range setting unit which sets an analysis range of data, by an item of data and time period; a data grouping unit which classifies the data into a category based on specification and use condition of the apparatus to be monitored, and a category based on a physical quantity which the data shows, to group the data; a feature extracting unit which extracts a feature in each of the data items; an unusual phenomenon specifying unit which specifies an unusual phenomenon candidate item; and a testing unit which tests whether there is a significant difference or not between the unusual phenomenon candidate item and an other data item.

6 Claims, 8 Drawing Sheets

(56) References Cited

U.S. PATENT DOCUMENTS

| | | | | |
|---|---|---|---|---|
| 2013/0132000 A1 | 5/2013 | Tamaki | | |
| 2013/0282336 A1* | 10/2013 | Maeda | ............... | G05B 23/0229 |
| | | | | 702/184 |
| 2013/0318011 A1* | 11/2013 | Jones | ...................... | G06F 11/07 |
| | | | | 706/12 |
| 2014/0074433 A1* | 3/2014 | Crepet | ................... | G05B 23/02 |
| | | | | 702/183 |
| 2014/0163926 A1* | 6/2014 | Pedersen | ............ | G05B 23/0278 |
| | | | | 702/183 |

FOREIGN PATENT DOCUMENTS

| | | |
|---|---|---|
| JP | 2006-338373 A | 12/2006 |
| JP | 2010-191556 A | 9/2010 |
| JP | 2011-243118 A | 12/2011 |
| JP | 2013-137797 A | 7/2013 |

* cited by examiner

MANUFACTURING EQUIPMENT DIAGNOSIS SUPPORT SYSTEM

FIELD

The present invention relates to a manufacturing equipment diagnosis support system which predicts abnormality and/or a malfunction beforehand, in a manufacturing equipment such as a rolling mill which rolls a metal material with rolls and a machining center which performs machining.

BACKGROUND

There exists a lot of manufacturing equipment as a social infrastructure. The rolling mill and the machining center are examples of the manufacturing equipment. The rolling mill is equipment for rolling and thinning a block of a ferrous material or a non-ferrous material such as aluminum and copper, and thereby facilitating the metal material to be worked into vehicles and electrical products. The machining center is equipment for machining, for instance, steel plates to manufacture airplanes, automobiles, various dies and the like.

The manufacturing equipment is strongly required to manufacture a product stably and at high speed. For this reason, in order to avoid production inhibition due to a failure of the manufacturing equipment, a technology for predicting abnormality and/or a malfunction in the manufacturing equipment beforehand has been progressively developed. Recently, a technology is advancing which picks up significant information from among a large amount of data, such as data mining and big data analysis. In these technologies, such a process is also performed as to submit data to processing which uses a forcible technique of using a high-speed large-capacity calculator, calculate features of data, and extract a relationship between the data. Prior art documents which describe the specific contents include the following patent literatures, for instance.

PTL 1 discloses a technology for finding out regularity between the data when there are a plurality of data. This technology is a technology of dividing the data into certain sections, calculating a feature in the section, classifying the features, and giving a label value to the features thereby to find out the regularity. However, this technology is not a technology particularly of targeting manufacturing equipment, but is a proposal of a general method.

A technology disclosed in PTL 2 is a technology of extracting a feature of data by using a statistical technique such as wavelet transformation and a principle component analysis, finding out similarity to failure data stored in the past, and determining the abnormality. This technology also does not target the manufacturing equipment, in particular, but is a proposal of a general method.

A technology disclosed in PTL 3 is a technology of determining similarity between a past normal example and an abnormal example with reference to the examples, and determining whether there is abnormality or not in the plant or the equipment, similarly to the technology disclosed in PTL 2.

CITATION LIST

Patent Literature

[PTL 1] JP 2006-338373 A
[PTL 2] JP 2006-106870 A
[PTL 3] JP 2010-191556 A

SUMMARY

Technical Problem

The technology disclosed in PTL 1 does not use prior knowledge (for instance, correlation between data, and the like) which exists in object data, and tries to find out regularity only within the object data. Then, it is anticipated that the calculation processing takes many time periods. In addition, when noise and unknown disturbance are included in the data, there is a concern that the extraction of the regularity becomes unstable.

The technologies disclosed in PTL 2 and PTL 3 are characterized in that the technologies use past knowledge concerning abnormality and/or malfunction. However, of course, the past knowledge is useful, but cannot be applied without prior knowledge that the abnormality and/or the malfunction have occurred in the past, and the technologies cannot cope with the new abnormality and/or the malfunction which has never occurred.

In contrast to these conventional technologies, the manufacturing equipment diagnosis support system which the present invention provides compares data of a plurality of similar apparatuses which are arranged in manufacturing equipment or data of a plurality of similar apparatuses which are dispersedly arranged in a plurality of sets of manufacturing equipment, to each another, and thereby can easily detect the abnormality and/or the malfunction of the apparatus without needing enormous calculation processing for finding out the regularity and also without needing the past knowledge.

Solution to Problem

A manufacturing equipment diagnosis support system according to the present invention includes a data collecting device which always or intermittently collects and records respective data in a plurality of apparatuses to be monitored that are arranged in manufacturing equipment, or in a plurality of apparatuses to be monitored that are dispersedly arranged in a plurality of sets of manufacturing equipment. The manufacturing equipment diagnosis support system according to the present invention also includes a data analysis device which analyzes the data that has been recorded in the data collecting device, and a display device which displays an analysis process and an analysis result of the data analysis device. The data analysis device includes data analysis range setting means, data grouping means, feature extracting means, unusual phenomenon specifying means, and testing means.

The data analysis range setting means is configured so as to set a range of analysis of data which has been recorded in the data collecting device, by a data item and a time period.

The data grouping means is configured so as to input data existing in the range which has been set by the data analysis range setting means from the data collecting device; classify each of the data into a category based on specification and use condition of the apparatus to be monitored from which the data has been collected, and a category based on a physical quantity which the data shows; and thereby group the data which the data grouping means has inputted from the data collecting device. The data grouping means is preferably configured so as to equalize the number of the data items in each group, among the groups; give an intra-group data number to each of the data items for identification in the group, and gives a group number to each of the data items for identification among the groups.

The feature extracting means is configured so as to extract a feature in each of the items of the data which have been grouped by the data grouping means. The feature extracting means is preferably configured so as to calculate the same types of features, for two of original data and deviation between a signal obtained by filtering the original data and the original data.

The unusual phenomenon specifying means is configured so as to compare the features of each of the data items which have been extracted by the feature extracting means to each other, each in the group and between the groups, and when there is a data item indicating a different phenomenon from other data items, to specify the data item as an unusual phenomenon candidate item. The unusual phenomenon specifying means is preferably configured so as to compare the features between the data items in the same group; when there is a data item of which the magnitude of the feature is different from that of the other data item by a predetermined ratio or more, specify the data item as an unusual phenomenon candidate item of a first level; and when the data item which is common in the apparatus to be monitored has been specified as the unusual phenomenon candidate item of the first level over a plurality of groups, specify the data item as an unusual phenomenon candidate item of a second level.

The testing means is configured so as to test whether there is a significant difference or not between the unusual phenomenon candidate item which has been specified by the unusual phenomenon specifying means and the other data item, and when there is a significant difference therebetween, to determine the data item which has been specified to be the unusual phenomenon candidate item, as the unusual phenomenon item. The testing means is preferably configured so as to perform a statistical test between the feature of the data item which has been specified as the unusual phenomenon candidate item of the first level by the unusual phenomenon specifying means, and the feature of the other data item in the same group; when such a null hypothesis that there is no significant difference therebetween of a predetermined significant level has been discarded, specify the data item as the unusual phenomenon item of the first level; and in the case where the data item is also the unusual phenomenon candidate item of the second level, when the data item in the other group common in the apparatus to be monitored also corresponds to the unusual phenomenon item of the first level, specify the data item as the unusual phenomenon item of the second level.

The data analysis device is preferably configured so as to change a time period in a range of the analysis of the data by the data analysis range setting means after a series of data analysis has been completed, and execute the series of the data analysis on the basis of the data in the changed range again.

Advantageous Effects of Invention

The manufacturing equipment diagnosis support system according to the present invention can automatically collect and record respective data in a plurality of apparatuses to be monitored, which are arranged in manufacturing equipment or in a plurality of apparatuses to be monitored, which are dispersedly arranged in a plurality of sets of manufacturing equipment. Then, data in an analysis range which has been set by the data item and the time period is grouped into a category based on the specification and the use condition of the apparatus to be monitored from which the data has been collected, and a category based on a physical quantity shown by the data; and features in each of the items of the grouped data are calculated. Then, the features in each of the data items are compared to each other, each in the group and between the groups, and when there is a data item indicating a different phenomenon from the other data items, the data item is specified as the unusual phenomenon candidate item. Then, it is tested whether there is a significant difference or not between the specified unusual phenomenon candidate item and the other data item, and when there is the significant difference, the data item which has been specified to be the unusual phenomenon candidate item is determined to be the unusual phenomenon item. The process and the result of thus performed data analysis are displayed on the display device, and thereby an administrator or a user can determine whether abnormality and/or a malfunction occurs in the manufacturing equipment, or not, from the content displayed on the display device.

DESCRIPTION OF EMBODIMENTS

Embodiments of the present invention will be described below with reference to the drawings. However, the following embodiments illustrate the apparatus and the method for embodying the technical idea of the present invention, and do not intend to limit a structure and arrangement of components, an order of processing, and the like to the following description, except for the case where it is explicitly described. The present invention is not limited to the embodiments shown below, but can be variously changed to be carried out within such a range as not to deviate from the scope of the present invention.

Embodiment 1

Figure 1:
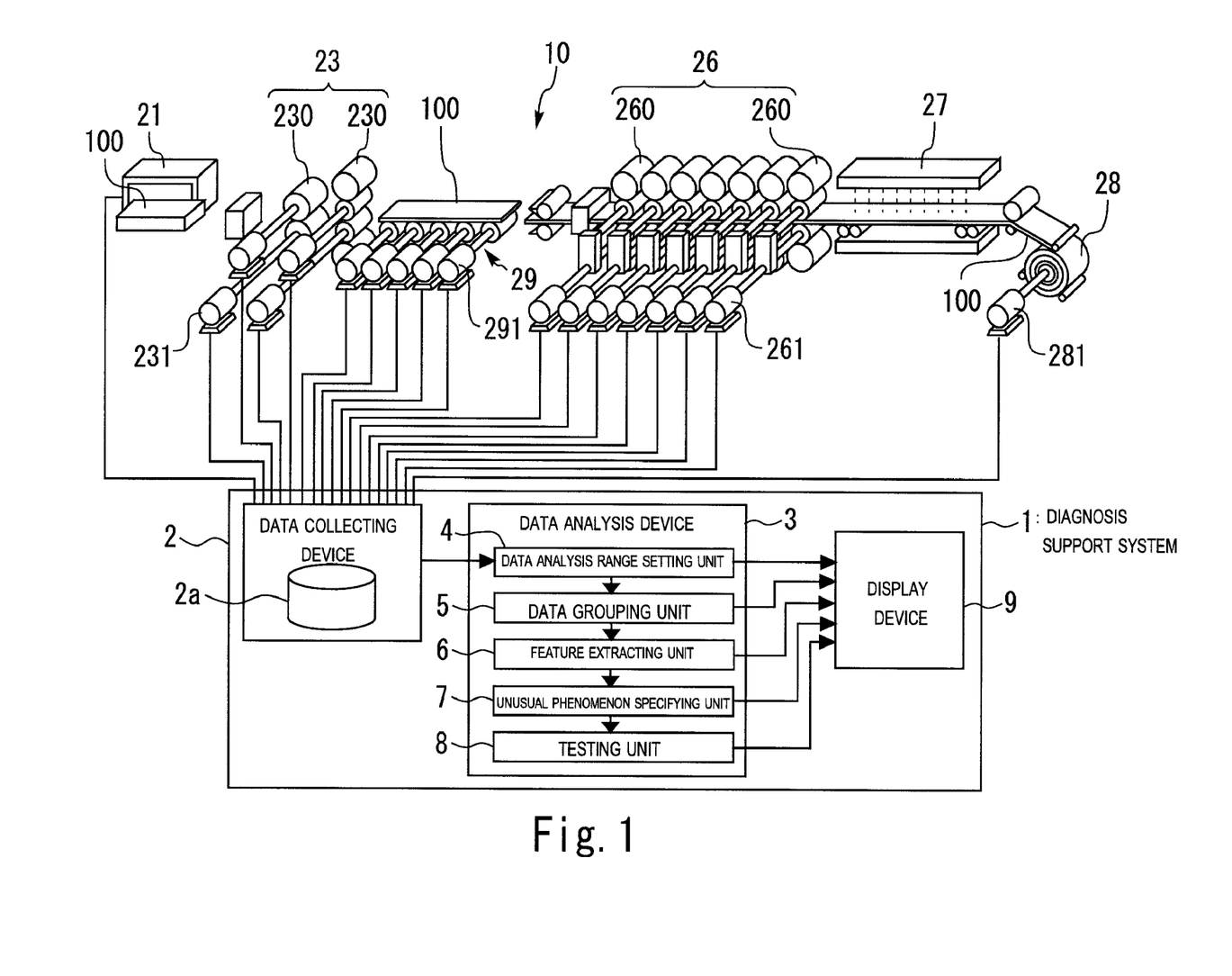
FIG. 1 is a view showing a configuration of a system in Embodiment 1 of the present invention.

FIG. 1 is a view showing a configuration of a system of Embodiment 1 of the present invention. A diagnosis support system 1 in Embodiment 1 targets a rolling mill 10 in a hot strip rolling process, as an object of diagnosis support. The rolling mill 10 shown in FIG. 1 has a heating furnace 21, a rough rolling mill 23, a finishing mill 26, a coiler 28 and a conveying table 29. A material 100 to be rolled which has been carried out from the heating furnace 21 is rolled by the rough rolling mill 23. The rough rolling mill 23 has one or several (two in FIG. 1) rolling stands 230. Rolls of each of the rolling stands 230 are driven by a motor 231. After having been rolled by the rough rolling mill 23, the material 100 to be rolled is conveyed to the finishing mill 26 by the conveying table 29. Rollers of the conveying table 29 are driven by a plurality of motors 291, respectively. The finishing mill 26 has five to seven (seven in FIG. 1) rolling stands 260, and rolls the material 100 to be rolled down to a strip thickness of a desired product. The roller of each of the rolling stands 260 is driven by a motor 261. The rolled material 100 which has been carried out from the finishing mill 26 is cooled by a cooling device 27, and then is wound into a coiled form by the coiler 28. The coiler 28 is driven by a motor 281.

The diagnosis support system 1 is not a system for diagnosing the normality or abnormality of the rolling mill 10, but a system for supporting a diagnosis of the rolling mill 10 by the administrator or the user. In more detail, the diagnosis support system 1 collects and analyzes data which the administrator or the user uses for the diagnosis of the rolling mill 10, presents the analysis result and the analysis process to the administrator or the user, and thereby supports the diagnosis which the administrator or the user himself performs. Because of this, the diagnosis support system 1 includes a data collecting device 2, a data analysis device 3 and a display device 9.

The data collecting device 2 is a device which always (or intermittently at predetermined time intervals) collects data from each of the heating furnace 21, the rough rolling mill 23, the finishing mill 26, the coiler 28 and the conveying table 29 that constitute the rolling mill 10, and records the collected data in a recording device 2a. The recording device 2a is, for instance, a large-capacity hard disk, and may be built in the data collecting device 2 or may be arranged in the outside of the data collecting device 2. The data collecting device 2 and the rolling mill 10 are connected by LAN through an unillustrated I/O device. The finishing mill 26 has seven rolling stands 260, but each of the rolling stands 260 or each of the motors 261 is an apparatus to be monitored which is monitored by the diagnosis support system 1. Therefore, the data collecting device 2 collects data on each of the rolling stands 260 or each of the motors 261. The rough rolling mill 23 is also similar to the finishing mill 26, and the data collecting device 2 collects data on each of the rolling stands 230 or each of the motors 231, which are apparatuses to be monitored. Also as for the conveying table 29, the data collecting device 2 collects data on each of the motors 291 which are apparatuses to be monitored. In the case of the rolling stand, for instance, the data to be collected includes a motor current, a speed, a roll force, a roll gap and the like (in FIG. 2, only a part of data to be collected is drawn). The collected data on each of the items is recorded in the recording device 2a with time series.

A data analysis device 3 is a device that analyzes the data which the data collecting device 2 has recorded in the recording device 2a. The data analysis device 3 may be a dedicated device or may also a general-purpose computer. In addition, the data analysis device 3 may be integrated with the data collecting device 2. The data analysis device 3 has a data analysis range setting unit 4, a data grouping unit 5, a feature extracting unit 6, an unusual phenomenon specifying unit 7 and a testing unit 8. These units 4 to 8 which the data analysis device 3 has adapts to a control program that is stored in a memory of the data analysis device 3, or to a part thereof. The control program is read out from the memory and is executed by a processor, and thereby the functions of these units 4 to 8 are achieved by the data analysis device 3. The functions of these units 4 to 8 which constitute the data analysis device 3 will be described below.

Firstly, the data analysis range setting unit 4 will be described below. The data analysis range setting unit 4 sets the range of the data to be input from the data collecting device 2. Enormous data is stored in the recording device 2a of the data collecting device 2. Because of this, it is advantageous for the reduction of a calculation time period and the reduction of a load of the computer to reduce the quantity of data to be input. The data analysis range setting unit 4 sets the range of the data to be input, by the data item and the time period. In order to analyze the finishing mill 26 in the rolling mill 10, for instance, generally, the data analysis device 3 does not need the data of the heating furnace 21 and the coiler 28, and accordingly the data analysis range setting unit 4 selects only the necessary data item. In addition, far past data in the stored data is occasionally unnecessary, and accordingly the data analysis range setting unit 4 limits the data to data collected after a certain time. However, depending on the time length of the analysis object data, there is the case where the change of the state of the apparatus to be monitored cannot be grasped. Because of this, the data analysis range setting unit 4 has a function of changing the data analysis object time period so as to repeatedly perform a series of analysis, which will be described later.

Next, the data grouping unit 5 will be described below. The data grouping unit 5 inputs the data in the range which has been set by the data analysis range setting unit 4, from the data collecting device 2, and groups the input data. The data is grouped into a first category which specifies similarity between the apparatuses to be monitored, and a second category which specifies similarity between the contents of the data.

The first category which has been grouped is a category based on the specification and the use condition of the apparatus to be monitored. The data that has been collected from the apparatuses to be monitored which have a similar specification and a similar use condition is gathered, and forms one population. The specification described here, in the case where the apparatus to be monitored is the motor, for instance, corresponds to a type and a capacity of a motor, and the like. In addition, the use condition described here, in the case where the apparatus to be monitored is the motor, for instance, corresponds to a load applied to the motor, an operation schedule and the like. In the rolling mill 10, the seven rolling stands 260 of the finishing mill 26 correspond to apparatuses which have a similar specification and a similar use condition. The two rolling stands 230 of the rough rolling mill 23 also correspond to the similar apparatuses, and a plurality of motors 291 which constitute the conveying table 29 also correspond to the similar apparatuses. In addition, the seven rolling stands 260 of the finishing mill 26 and the two rolling stands 230 of the rough rolling mill 23 can be packaged as the similar apparatus.

The second category that has been grouped is a category based on the physical quantity which the data shows. The physical quantity which the data shows means a motor current, a speed, a roll force, a roll gap and the like, in the case of the data which has been collected from the rolling stand 260, for instance. These factors are physical quantities which are mutually independent, and a physical quantity having a correlation with the other physical quantity is not contained in the category item. Specifically, the physical quantity relating to the rolling stand 260 contains also a motor torque, but the motor torque has a correlation with the motor current in a one-to-one relationship, and accordingly is not contained in the category item. The population formed by the first category is classified by the physical quantity, and a group of data which shows the same physical quantity is formed. The numbers of the data items in the groups are equalized among the groups. In addition, the intra-group data number is given for identification of the data item in the group, and the group number is given for identification of the group.

Figure 2:
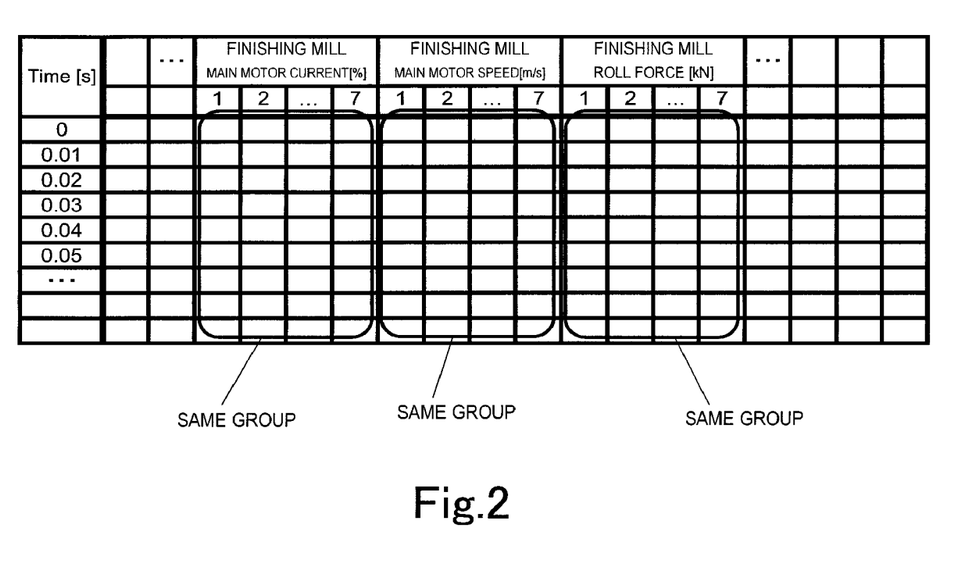
FIG. 2 is a view for describing an example of the grouping of data in Embodiment 1 of the present invention.

Here, a specific example of the grouping of the data will be described below with reference to FIG. 2. The seven data in original data such as the motor current, the speed, the roll force and the roll gap which have been collected from the seven rolling stands 260 of the finishing mill 26 are packaged into one group for each data item, and are arranged in the storage region of the recording device 2a. Even when the original data are dispersedly arranged in the recording device 2a, the data grouping unit 5 can edit the original data so as to compile the original data. In the example shown in FIG. 2, each of three data items of an electric current [%] of a main motor of the finishing mill, a speed [m/s] of the main motor of the finishing mill, and a roll force [kN] of the finishing mill is packaged into one group, and the group numbers are given thereto which can be each identified. There are seven data items in each of the groups, and the seven data items correspond to the number of the rolling stands 260 of the finishing mill 26. As for the intra-group data numbers in this case, the numbers from No. 1 to No. 7 are used. No. 4 in a main motor current group of the finishing mill means the main motor current of the fourth stand of the finishing mill. According to this definition, the numbers of the data items in each group become equal among the groups.

Next, the feature extracting unit 6 will be described below. The feature extracting unit 6 extracts the feature in each of the items of the data which has been grouped by the data grouping unit 5. The feature can be defined as an amount that easily makes the feature obvious which the data has. One example of the method of extracting the feature includes subjecting the object data to statistical processing. Any one of the average value, the central value (median), the maximum value, the minimum value, and the standard deviation or the variance (where square root of variance is standard deviation), which is each a basic statistical amount, can be adopted as the feature. When the data fluctuates, the frequency and the amplitude are also the feature. In addition, if the data is expressed by a function of "y=a*x+b" through regression analysis, the coefficients a and b (regression coefficients) of the function can thereby be made to be the feature of the data. Furthermore, the feature by other statistical analyses such as distribution of the amplitude of the frequency band which is obtained by the Fourier transformation, and the frequency distribution with time series which is obtained by wavelet transformation can also be calculated.

However, when the statistical analysis is applied to the original data as it is, there is the case where the feature which the data has cannot be correctly grasped. For instance, the original data (A) (which are shown by solid line) arranged with time series in the chart of the upper chart in FIG. 3 contains signals of which the levels are largely different between the time when the material is rolled and the time when the material is not rolled. The electric current of the main motor, the roll force and the like correspond to the signals, and become excessively large values during rolling, but are values in the vicinity of 0 when the material is not rolled. When the statistic amount of the original data (A) is determined, the maximum value is a value when the material is rolled, and the minimum value is a value when the material is not rolled. The standard deviation is calculated while a difference between the illustrated maximum value and minimum value is evaluated. When these statistic amounts are adopted as the feature, for instance, even though a large fluctuation phenomenon occurs in the electric current of the motor, the fluctuation is small in comparison with a level of the electric current at the time of rolling, and accordingly there is a possibility that the fluctuation is overlooked.

Figure 3:
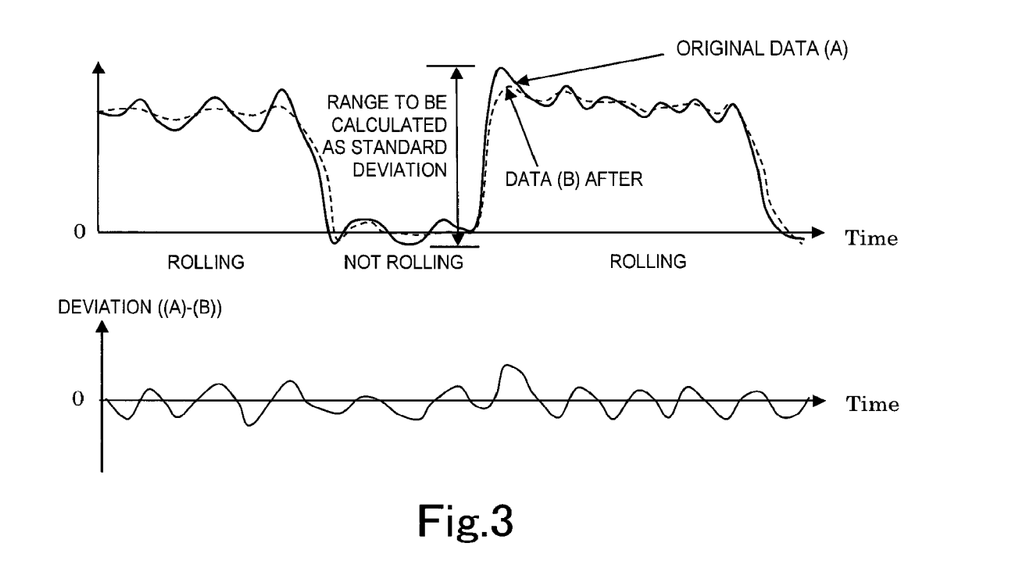
FIG. 3 is a view for describing one example of the extraction of a feature in Embodiment 1 of the present invention.

Then, as is shown in the chart of the upper stage in FIG. 3, the original data (A) is subjected to filtering (for instance, Low pass filter), and a signal (B) shown by a dashed line is obtained. Then, as is shown in the chart of the lower stage in FIG. 3, a deviation ((A)-(B)) between the signal (B) obtained by the filtration of the original data (A) and the original data (A) is calculated. This standard deviation ((A)-(B)) is subjected to the statistical processing, and then the fluctuation which occurs in the motor current can be made obvious. Then, the feature extracting unit 6 calculates the feature for the original data, and calculates the same feature also for the deviation between the signal obtained by the filtration of the original data and the original data.

In addition, the feature extracting unit 6 has a function of changing a period of an object, for which the analysis is performed. The significance that the feature extracting unit 6 has such a function will be described below with reference to FIG. 4. As is shown in each of the charts in FIG. 4, the feature extracting unit 6 sets a time window in the range of the original data to be analyzed. Then, the feature extracting unit 6 subjects the original data in the time window to linear approximation through regression analysis. From a straight line obtained by the linearity approximation, the tendency of the change of the original data can be known, and the variation of the original data can be known from the distance between the straight line and the original data.

Figure 4:
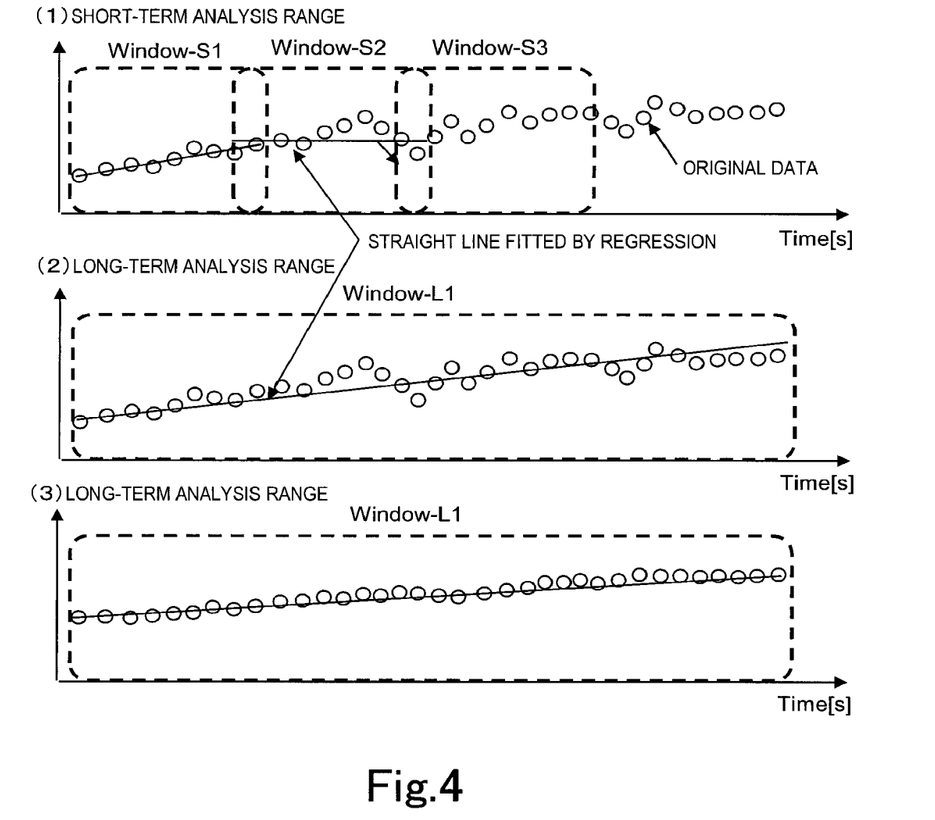
FIG. 4 is a view for describing the significance of changing an analysis range in Embodiment 1 of the present invention.

In the chart (1) in FIG. 4, time windows-S1, -S2 and -S3 are set as short term analysis objects. The time windows-S1, -S2 and -S3 are set so as to be shifted in the time period direction, and an overlap is provided each in between the adjacent time windows-S1 and -S2 and between the windows-S2 and -S3. In the chart (2), the time window-L10 is set as a long term analysis object, for the same original data as that in the chart (1). When the original data in the time window-L1 shown in the chart (2) is subjected to regression analysis, it can be understood that the original data shows a tendency of increasing in a long term. However, in the case where the original data in the short-term time window shown in the chart (1) is subjected to the regression analysis, an increasing tendency is detectable in the original data in the window-S1, but the increasing tendency is not detectable in the original data in the window-S2. On the other hand, in the chart (3) in FIG. 4, the time window-L1 is set as a long term analysis object, of which the data is different from the original data in the charts (1) and (2). When the original data in the time window-L1 is subjected to the regression analysis, the increasing tendency of the original data can thereby be detected. However, when the time window is set at a short period, there is also a possibility that the increasing tendency will be overlooked.

Thus, when the period of an object, for which the analysis is performed, is limited to the long period or the short period, there is a possibility that the tendency of the short-term or long-term change of the original data is overlooked. The feature extracting unit 6 has a function of changing the period of an object, for which the analysis is performed, and thereby does not overlook the tendency of the short-term or long-term change of the original data.

Figure 5:
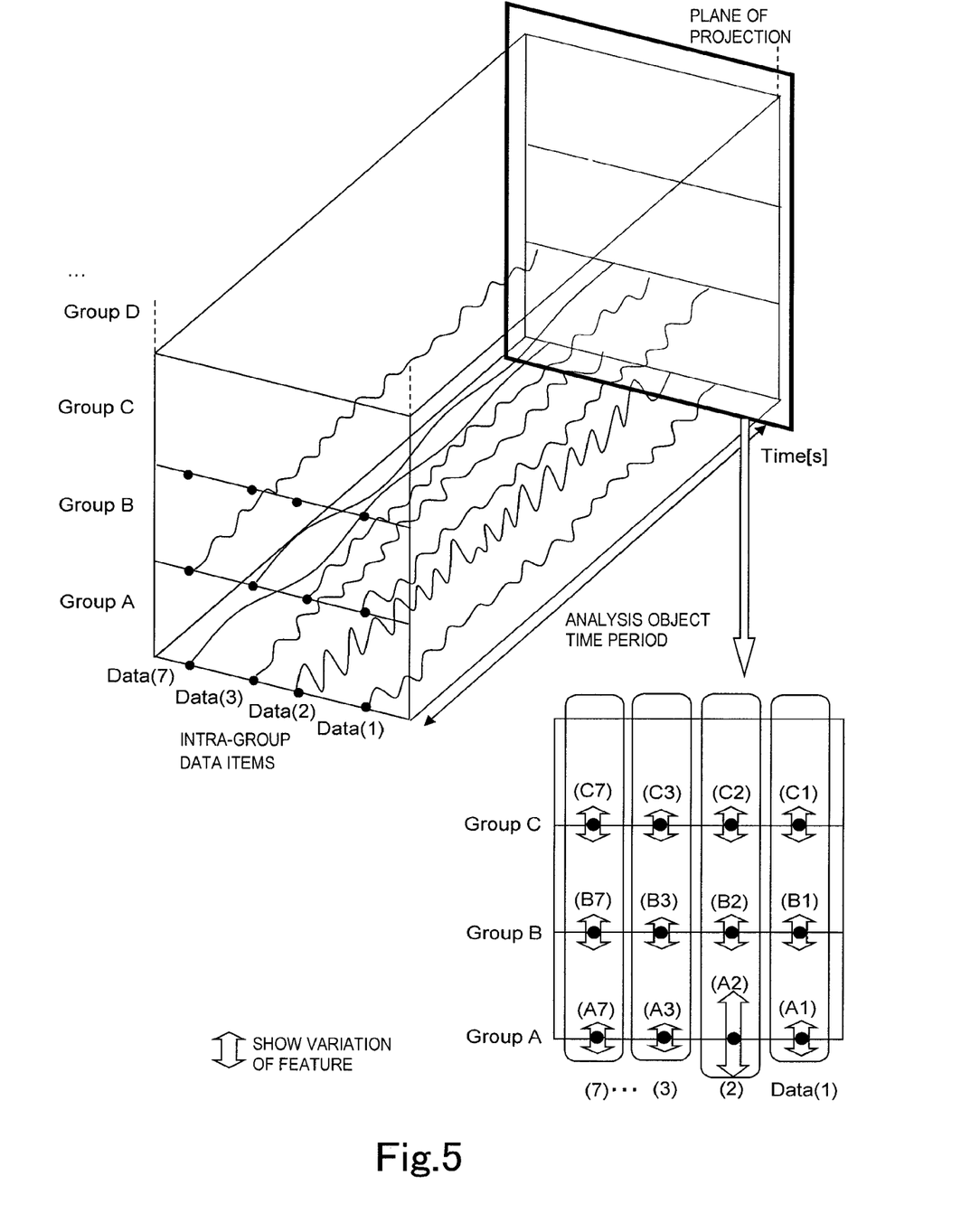
FIG. 5 is a view showing one example of the determination of an unusual phenomenon candidate item in Embodiment 1 of the present invention.
Figure 6:
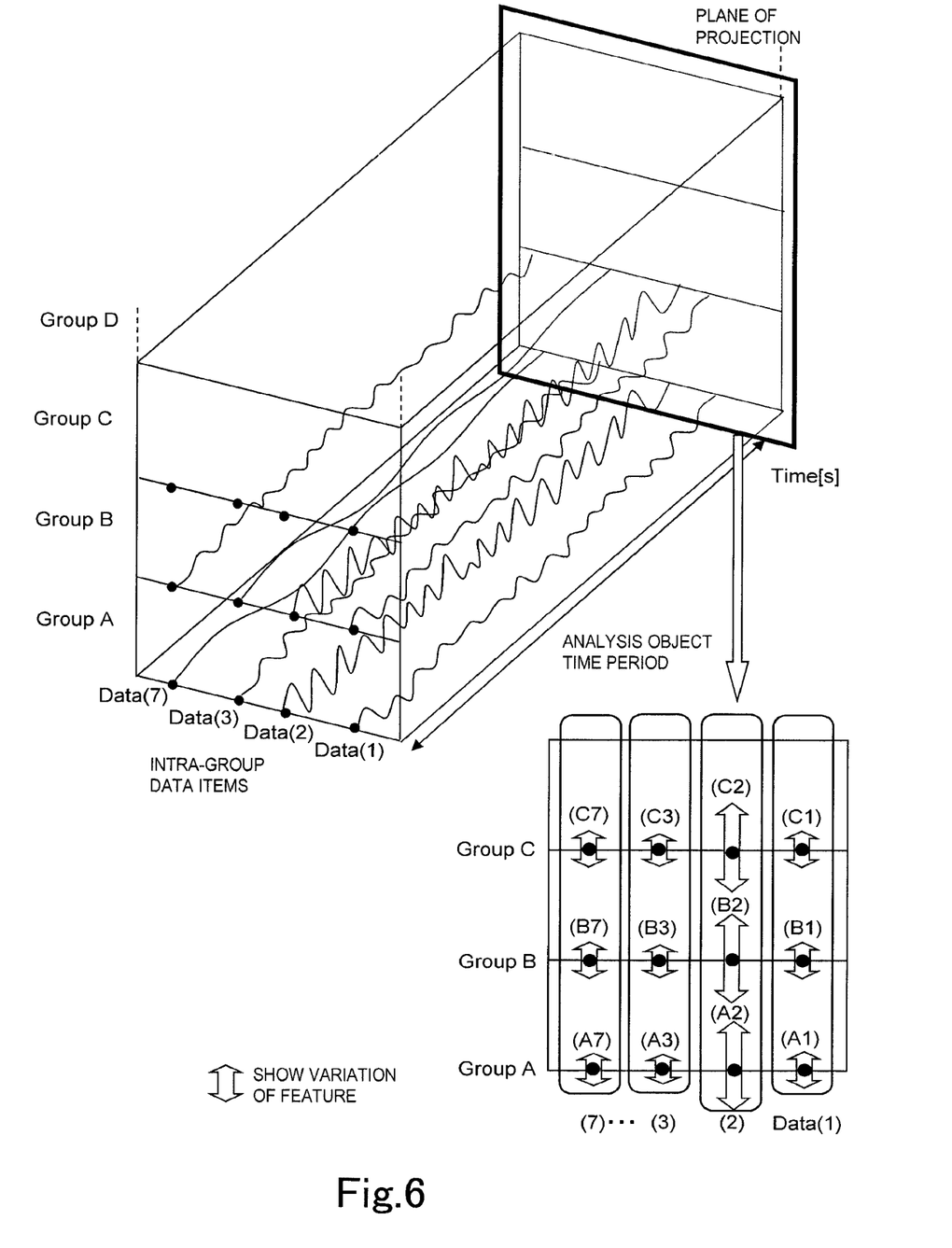
FIG. 6 is a view showing one example of the determination of the unusual phenomenon candidate item in Embodiment 1 of the present invention.

Next, the unusual phenomenon specifying unit 7 will be described below. The unusual phenomenon specifying unit 7 compares the features of each of the data items which have been extracted by the feature extracting unit 6, to each other, each in the group and between the groups, and when there is a data item indicating a different phenomenon from others, specifies the data item as an unusual phenomenon candidate item. This process will be described below with reference to FIG. 5 and FIG. 6. Here, the original data shall be divided into a plurality of groups to which group numbers A, B, C, D and the like are given, and there shall be seven data items in each of the groups, to which the intra-group data numbers (1), (2) and (3) to (7) are given. In addition, as for a specific example, the data shall be collected from the finishing mill 26, the group A shall be a main motor current of a finishing mill, the group B shall be a roll force of a finishing mill, and seven rolling stands 260 shall correspond to the seven data items. In FIG. 5 and FIG. 6, the original data in the analysis object range are arranged on a three-dimensional graph with time series in an X-axis direction, and the arranged data in each group are overlapped in a Y-axis direction; and data having the same intra-group data number are displayed so as to be arranged on a single row in a Z-axis direction. Incidentally, this display is a display for visually facilitating the description of the change of the original data with the time period in each group and in each data item, and it is not necessarily needed to perform this display.

In each lower right of FIG. 5 and FIG. 6, a plane face is drawn on which the feature is projected that has been obtained by the analysis of the original data within the analysis object time period. In this plane face, the features of the respective data of intra-group data numbers (1), (2) and (3) to (7) in the group numbers A, B and C are shown by a length between both arrows. Here, the feature shall be the magnitude of the standard deviation. In the example shown in FIG. 5, the standard deviation of the data of the data number (2) in the group A is the largest.

The unusual phenomenon specifying unit 7 firstly compares the features among the data items in the same group. Then, when there is a data item in which the magnitude of the feature is different from those in the other data items by a predetermined ratio or more (for instance, 30% or more), the unusual phenomenon specifying unit 7 specifies the data item as an unusual phenomenon candidate item of a first level. In the example shown in FIG. 5, the data item of the data number (2) in the group A corresponds to the unusual phenomenon candidate item of the first level. However, in the groups B and C, the data item in which the magnitude of the feature is largely different from those in the other data items is not included, and there does not exist the unusual phenomenon candidate item of the first level.

Thus, when some data item has been specified as the unusual phenomenon candidate item of the first level only in one group, there is a possibility that some abnormality relating to the physical quantity which the group shows occurs in an apparatus corresponding to the data item. In the example shown in FIG. 5, in the second stand of the data number (2) in the finishing mill, the standard deviation of the main motor current of the finishing mill in the group A is larger than those of the other stands, and accordingly it can be determined that there is a possibility that some abnormality occurs in the periphery of the motor of the second stand in the finishing mill.

On the other hand, in the example shown in FIG. 6, in the groups A, B and C, the standard deviation of the data of the data number (2) is larger than those of the data of the other data numbers. Specifically, FIG. 6 shows such a situation that the main motor current of the finishing mill in the group A also fluctuates, the finishing mill roll force in the group B also fluctuates, and so on. In this case, the data items of the data numbers (2) in the groups A, B and C correspond to the unusual phenomenon candidate item of the first level, respectively.

Thus, when some data item has been specified as the unusual phenomenon candidate item of the first level over a plurality of groups, there is a possibility that some phenomenon, for instance, a vibrational phenomenon has occurred in the apparatus corresponding to the data item. However, it cannot be specified whether the phenomenon is a phenomenon caused by the abnormality of the apparatus, a phenomenon caused by the characteristics of an article to be worked, a phenomenon caused by an operation of a control system, or a phenomenon which has occurred by accident. Then, the unusual phenomenon specifying unit 7 specifies such a data item as is the data item of the data number (2) in the example shown in FIG. 6, as an unusual phenomenon candidate item of a second level.

As has been described above, the unusual phenomenon specifying unit 7 firstly compares the features among the data items in the same group. Then, when there is a data item in which the magnitude of the feature is largely different from those of the other data items, the data item is specified as the unusual phenomenon candidate item of the first level. Furthermore, when the data item has been specified as the unusual phenomenon candidate item of the first level over a plurality of groups, the data item is specified as the unusual phenomenon candidate item of the second level.

Next, the testing unit 8 will be described. The testing unit 8 performs a statistical test of testing whether there is abnormality or not in the unusual phenomenon candidate item which has been specified by the unusual phenomenon specifying unit 7, in other words, the data item which has a possibility of being abnormal. The test is performed on whether or not there is a significant difference between the unusual phenomenon candidate item and the other data items, and when there is the significant difference therebetween, the data item which has been specified as the unusual phenomenon candidate item is determined as the unusual phenomenon item.

In detail, the testing unit 8 performs a statistical test between the feature of the data item which has been determined as the unusual phenomenon candidate item of the first level, and the feature of the other data items in the same group. As a specific testing method, for instance, a t-test can be applied. In the t-test, such a null hypothesis is set up that "there is not a significant difference between the data item which has been determined as the unusual phenomenon candidate item of the first level and the other data item in the same group", and it is tested whether or not the null hypothesis can be discarded at a predetermined significant level (generally 5%). In the case where the null hypothesis can be discarded, the testing unit 8 determines that there is a high possibility that abnormality occurs in the apparatus relating to the data item including only the unusual phenomenon candidate item of the first level, and specifies the data item as the unusual phenomenon item of the first level. The testing unit 8 applies this test to all of the unusual phenomenon candidate items of the first level. Then, in the case where the data item which has been specified as the unusual phenomenon item of the first level is also the unusual phenomenon candidate item of the second level, the testing unit 8 performs the above described test on the plurality of groups. Then, in the case where the data item corresponds to the unusual phenomenon item of the first level over a plurality of groups, the testing unit 8 determines the data item as the unusual phenomenon item of the second level.

Thus, the testing unit 8 specifies the unusual phenomenon item by level classification. When some data item is the unusual phenomenon item of the first level, it can be said that the apparatus corresponding to the data item needs a detailed investigation. On the other hand, when some data item is the unusual phenomenon item of the second level, it can be said that the apparatus corresponding to the data item needs to be paid attention to, even though the detailed investigation is not needed. However, when the some data item becomes the unusual phenomenon item of the second level on an ongoing basis, it can be said that the apparatus corresponding to the data item also needs the detailed investigation.

Figure 7:
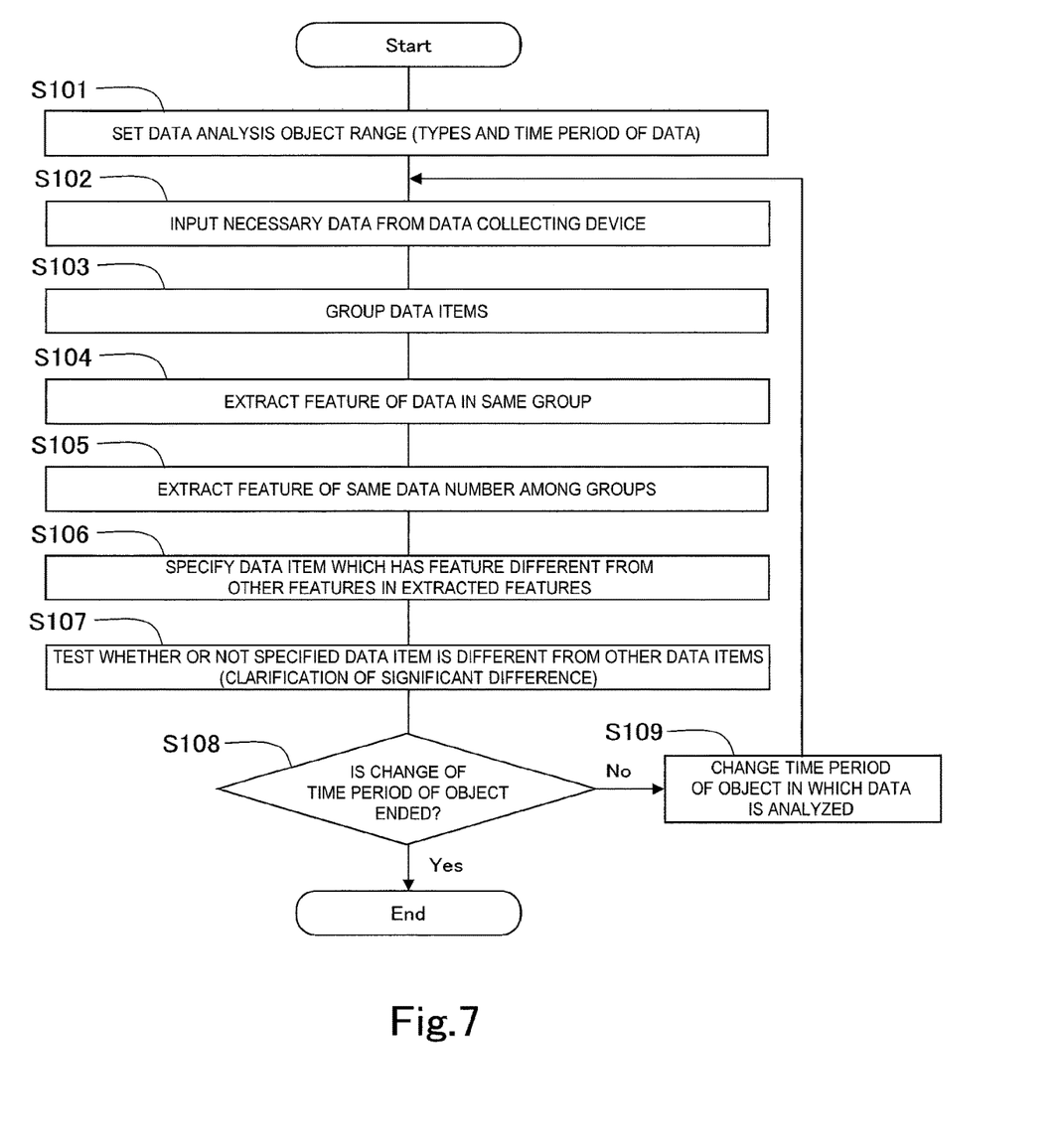
FIG. 7 is a flow chart showing a flow of data analysis in Embodiment 1 of the present invention.

The units 4-8 have the above described functions, and thereby a flow of data analysis according to the data analysis device 3 becomes a flow as in FIG. 7. As is shown in the flow chart in FIG. 7, the data analysis device 3 firstly sets a data analysis object range, by the function of the data analysis range setting unit 4, in step S101.

Next, in step S102, the data analysis device 3 inputs necessary data from the data collecting device 2 by the function of the data grouping unit 5, and in step S103, groups the input data item.

Next, in step S104, the data analysis device 3 extracts the feature of the data in the same group by the function of the feature extracting unit 6, and in step S105, extracts the feature of the same data number among the groups.

Next, in step S106, the data analysis device 3 specifies a data item which has a feature different from those of the other items, by the function of the unusual phenomenon specifying unit 7. Then, in step S107, the data analysis device 3 tests whether or not there is a significant difference between the specified data item and the other data item, by the function of the testing unit 8.

When the analysis for the data analysis object time period has been completed, which has been set in step S101, the data analysis device 3 checks whether or not the feature extracting unit 6 has changed the data analysis object time period to a long period from a short period or to the short period from the long period, in step S108. When the change of the time period is not ended, the data analysis device 3 changes the data analysis object time period to the long period from the short period or to the short period from the long period, in step S109, by the function of the data analysis range setting unit 4. The data analysis device 3 performs analysis processing from step S102 to step S107 on the changed data analysis object time period, and ends a series of processing.

An analysis process and an analysis result of the data analysis device 3 are displayed on the display device 9. The display device 9 is a display which is integrated with the data analysis device 3 or is connected to the data analysis device 3. The display screen of the display device 9 may be one or may also be plural. Any of FIG. 2, FIG. 3, FIG. 4, FIG. 5 and FIG. 6 is a specific example of the content which is displayed on the display device 9. When the display device 9 has a plurality of display screens, the display screens can display the contents shown in these figures at the same time thereon. When the display device 9 has one or a small number of the display screens, the display device 9 can selectively display the contents shown in these figures, by switching between the contents of the screen. An administrator or a user of the diagnosis support system 1 can determine whether or not abnormality and/or a malfunction occur in the rolling mill 10, based on knowledge and experience of himself, on the basis of the information which is supplied from the display device 9 through the display screen.

Figure 8:
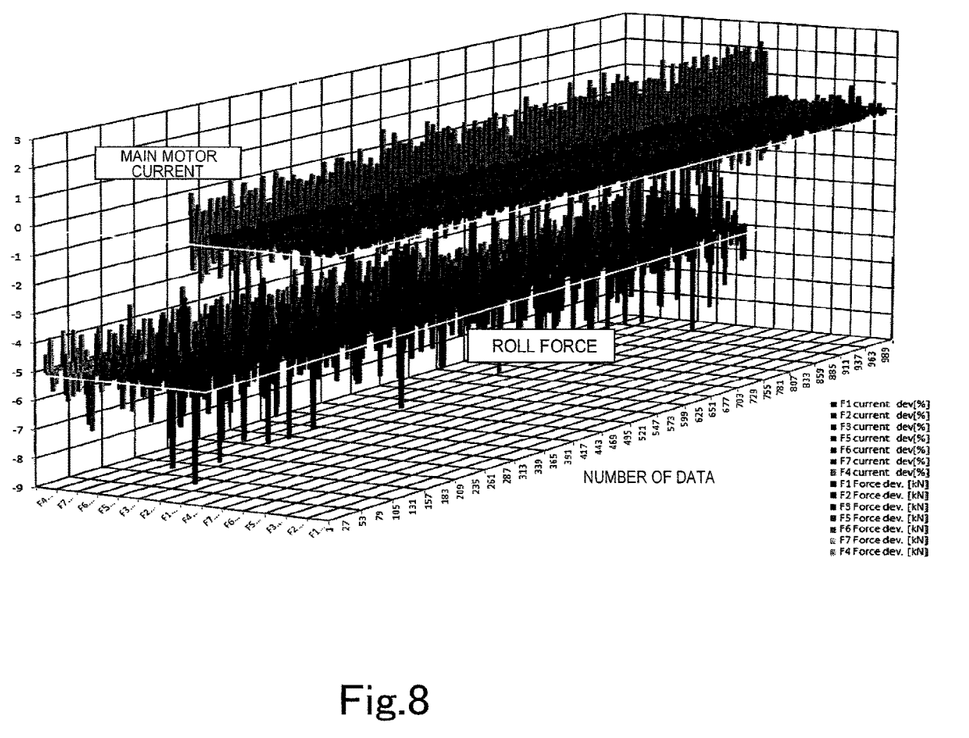
FIG. 8 is a view showing a display example in Embodiment 1 of the present invention.

Incidentally, FIG. 8 shows an example which has actually occurred in a finishing mill. In the graph in FIG. 8, the upper stage shows the change of the main motor current of each of the rolling stands, and the lower stage shows the change of the roll force of each of the rolling stands. In this example, as for the main motor current, the main motor current of the fourth stand (F4) fluctuates as compared to the main motor currents of the other stands. On the other hand, the roll force of the fourth stand (F4) does not fluctuate as compared to the roll forces of the other stands. The administrator who has looked the display screen of such a content has determined that some abnormality has occurred around a motor of the fourth stand.

Embodiment 2

Figure 9:
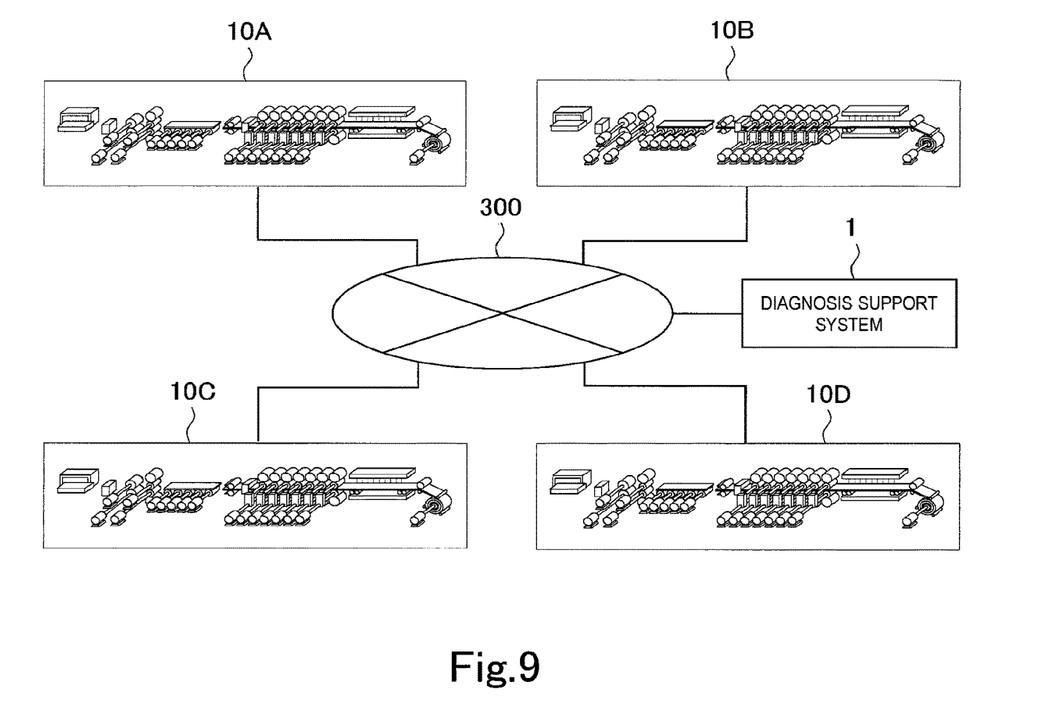
FIG. 9 is a view showing a configuration of a system in Embodiment 2 of the present invention.

FIG. 9 is a view showing a configuration of a system in Embodiment 2 of the present invention. In Embodiment 2, the diagnosis support system 1 is connected to a plurality of rolling mills 10A, 10B, 10C and 10D which are placed in places separated from the diagnosis support system 1, through Internet 300. The diagnosis support system 1 regards these rolling mills 10A, 10B, 10C and 10D, as objects of diagnosis support.

In Embodiment 2, the diagnosis support system 1 collects data from apparatuses to be monitored in each of the rolling mills 10A, 10B, 10C and 10D, analyzes the extracted data, and displays the analysis process and the analysis result, on the display device. In the analysis of the data, the diagnosis support system 1 classifies the data obtained from similar apparatuses to be monitored among the rolling mills 10A, 10B, 10C and 10D, into one group. For instance, when each of the rolling mills 10A, 10B, 10C and 10D has a finishing mill formed of seven rolling stands, the diagnosis support system 1 forms a group having 28 data items which correspond to the total number of the rolling stands, for each of the physical quantities such as a main motor current of the finishing mill and a roll force of the finishing mill. Then, in a similar way to that in Embodiment 1, the diagnosis support system 1 compares the features in each of the data items to each other, each in the group and between the groups, and specifies a data item indicating a different phenomenon from others, as the unusual phenomenon candidate item.

The diagnosis support system according to Embodiment 2 can increase the number of the data items which are objects to be compared, and accordingly can enhance the accuracy in specifying the unusual phenomenon candidate item, and can provide a more useful diagnostic material to the administrator or the user.

Other Embodiments

The manufacturing equipment to which the present invention can be applied is not only the rolling mill. For instance, the present invention can also be applied to a machine tool in which a plurality of machining centers having the same specification are installed. In this case, data obtained from these machining centers may be packaged into one group.

REFERENCE SIGNS LIST

1: Diagnosis support system
2: Data collecting device
2a: Recording device 3: Data analysis device
4: Data analysis range setting unit
5: Data grouping unit
6: Feature extracting unit
7: Unusual phenomenon specifying unit
8: Testing unit
9: Display device
10, 10A, 10B, 10C and 10D: Rolling mill
26: Finishing mill
260: Rolling stand

The invention claimed is:

1. A manufacturing system comprising:
a rolling mill equipment including at least a plurality of rolling mills which roll a material and a plurality of motors which power the plurality of rolling mills to roll;
a data collecting device connected with the rolling mill equipment by a local area network, the data collecting device continuously or intermittently monitors, collects, and records numerical data in the at least the plurality of rolling mills and the plurality of motors of the rolling mill equipment;
a data analysis device which analyzes the recorded numerical data, the data analysis device includes processing circuitry configured to:
set a range for the recorded numerical data based on a time period and one of a plurality of data items which specify one of the at least the plurality of rolling mills and the plurality of motors of the rolling mill equipment from which the numerical data to be analyzed is collected,
input numerical data within the set range from the recorded numerical data, and perform a first classification and a second classification for each piece of the numerical data within the set range so as to group the numerical data within the set range having a similar specification and a similar use condition into a group representing a same physical quantity, the first classification being a classification to form one population by gathering the numerical data within the set range having the similar specification and the similar use condition, the second classification being a classification performed with respect to the population formed by the first classification based on the same physical quantity,
extract a statistical value of the grouped numerical data in each of the plurality of data items of each group, the statistical value including one of an average value, a central value, a minimal value, a maximum value, a deviation, a variance, a frequency, or an amplitude of the grouped numerical data,
compare the statistical value of the grouped numerical data in the one of the plurality of data items with another statistical value of numerical data of another one of the plurality of data items in a same group, and when a difference between the statistical value and the other statistical value exceeds a predetermined ratio, specify the one of the plurality of data items as a first level unusual phenomenon candidate item,
test statistically whether there is a significant difference between the first level unusual phenomenon candidate item and other data items in the same group, and when there is the significant difference therebetween, determine that the first level unusual phenomenon candidate item is a first level unusual phenomenon item; and
a display device which provides an analysis result of the data analysis device to a user, by displaying a matrix of groups and data items within each group, the data items being arranged on a three-dimensional graph with time series in an X-axis direction, and the arranged data in each group being overlapped in a Y-axis direction and the data belonging to the same group being displayed so as to be arranged on a single row in a Z-axis direction, as the analysis result including the first level unusual phenomenon item, so that the user can perform diagnosis of the rolling mill equipment based on the analysis result displayed on the display device.

2. The manufacturing system according to claim 1, wherein
the processing circuitry is further configured to equalize a number of the plurality of data items in each group, assign an intra-group data number to each of the plurality of data items for identification in each group, and assign a group number to each group.

3. The manufacturing system according to claim 1, wherein
the processing circuitry is further configured to calculate the deviation of the grouped numerical data between a signal obtained by filtering the numerical data within the set range and the numerical data within the set range.

4. The manufacturing system according to claim 3, wherein
when the one of the plurality of data items is specified as the first level unusual phenomenon candidate item for more than one group, the processing circuitry is further configured to specify the one of the plurality of data items as a second level unusual phenomenon candidate item; and
when the one of the plurality of data items is specified as the second level unusual phenomenon candidate item and the one of the plurality of data items in another group is also specified as the first level unusual phenomenon candidate item, the processing circuitry is further configured to specify the one of the plurality of data items as a second level unusual phenomenon item.

5. The manufacturing system according to claim 1, wherein
the processing circuitry is further configured to determine that the first level unusual phenomenon candidate item is the first level unusual phenomenon item based on a null hypothesis, the null hypothesis determining that there is no significant difference between the first level unusual phenomenon candidate item and the other data items in the same group and that a predetermined significant level is discarded.

6. The manufacturing system according to claim 1, wherein
the processing circuitry is further configured to change the time period after a series of data analysis is completed, and execute the series of the data analysis based on the changed time period.

* * * * *